US012450404B1

(12) United States Patent
Fu et al.

(10) Patent No.: US 12,450,404 B1
(45) Date of Patent: Oct. 21, 2025

(54) CIRCULAR PIPE FILAMENT WINDING PROCESS SIMULATION METHOD, SYSTEM, MEDIUM, AND PRODUCT

(71) Applicant: Hefei University of Technology, Hefei (CN)

(72) Inventors: Jianhui Fu, Hefei (CN); Lei Zu, Hefei (CN); Guiming Zhang, Hefei (CN); Qian Zhang, Hefei (CN); Helin Pan, Hefei (CN); Qiaoguo Wu, Hefei (CN); Lichuan Zhou, Hefei (CN); Debao Li, Hefei (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 19/075,826

(22) Filed: Mar. 11, 2025

(30) Foreign Application Priority Data

Apr. 10, 2024 (CN) .......................... 202410429795.1

(51) Int. Cl.
*G06F 30/18* (2020.01)
*G06F 30/12* (2020.01)
(Continued)

(52) U.S. Cl.
CPC .............. *G06F 30/18* (2020.01); *G06F 30/12* (2020.01); *G06F 2113/10* (2020.01); *G06F 2113/14* (2020.01)

(58) Field of Classification Search
CPC ...... G06F 30/18; G06F 30/12; G06F 2113/14; G06F 2113/10; G06F 2111/00; G06F 2119/22
See application file for complete search history.

(56) References Cited

U.S. PATENT DOCUMENTS

2013/0220284 A1* 8/2013 Katsumata .............. F02B 33/00
123/559.1
2015/0220079 A1* 8/2015 Mitani ............. G05B 19/40937
700/160

(Continued)

FOREIGN PATENT DOCUMENTS

| CN | 116305351 A | 6/2023 |
| CN | 116629090 A | 8/2023 |
| CN | 117807740 A | 4/2024 |

OTHER PUBLICATIONS

H. Li, Y. Ma, "Filament winding pattern design for diameter-varying tube" p. 604-610, 2023 (First published online Oct. 25, 2022) (Year: 2023).*

(Continued)

*Primary Examiner* — Kibrom K Gebresilassie
(74) *Attorney, Agent, or Firm* — Addison D. Ault; IPGentleman Intellectual Property Services, LLC

(57) ABSTRACT

A circular pipe filament winding process simulation method includes: according to the geometric parameter of the circular pipe and the current pseudo dome parameter, constructing the stepped shaft circular pipe model; according to the winding parameter, calculating the initial center rotation angle for filament winding; according to the initial center rotation angle and the given deviation rotation angle, calculating the theoretical center rotation angle; according to the theoretical center rotation angle, determining the theoretical slip coefficient within the given slip coefficient range; determining whether the slip coefficient of the end point of the current stepped shaft circular pipe model is less than the current theoretical slip coefficient; if so, performing the simulation of the circular pipe filament winding process, and obtaining the trajectory according to the current theoretical slip coefficient; and if not, modifying the current pseudo (Continued)

dome parameter, and returning steps of constructing the stepped shaft circular pipe model.

5 Claims, 2 Drawing Sheets

(51) Int. Cl.
    *G06F 113/10*     (2020.01)
    *G06F 113/14*     (2020.01)

(56) References Cited

U.S. PATENT DOCUMENTS

| | | | |
|---|---|---|---|
| 2022/0026392 A1* | 1/2022 | Pyatnitsky | G01N 27/902 |
| 2023/0017601 A1* | 1/2023 | Zu | B29C 53/602 |
| 2023/0243241 A1* | 8/2023 | Fenocchi | F03B 13/02 |
| | | | 290/54 |

OTHER PUBLICATIONS

C. Chang, Z. Han, X. Li, S. Sun, J. Qin, H. Fu, "A Non-Geodesic Trajectory Design Method and Its Post-Processing for Robotic Filament Winding of Composite Tee Pipes" pp. 1-21 (Year: 2021).*
Yunusa Mujaheed, et al., Aluminium Lined, Carbon Composite Overwrapped Non-Geodesic Pressure Vessel Winding And Strength Analysis, FRP/CM, 2019, pp. 54-61, No. 12.
Xu Jiazhong, et al., Filament Winding Method and Application Based on Parametric Design, Engineering Plastics Application, 2016, pp. 52-56, vol. 44 No. 10.

* cited by examiner

CIRCULAR PIPE FILAMENT WINDING PROCESS SIMULATION METHOD, SYSTEM, MEDIUM, AND PRODUCT

CROSS REFERENCE TO THE RELATED APPLICATIONS

This application is based upon and claims priority to Chinese Patent Application No. 202410429795.1, filed on Apr. 10, 2024, the entire contents of which are incorporated herein by reference.

TECHNICAL FIELD

The invention relates to composite filament winding technology, particularly, a circular pipe filament winding process simulation method, system, medium, and product.

BACKGROUND

Composite materials are widely used in the aerospace, chemical, electric power, and automotive industries due to their high strength, lightweight, and excellent corrosion resistance. In recent years, the automotive industry's demand for lightweight containers for storing high-density hydrogen has driven innovation and applications in the composite industry.

Filament winding technology is an advanced manufacturing technology for manufacturing composite components with high strength, lightweight, and complex shapes. The technology uses a computer-controlled automated filament winding machine to wind the pre-designed fiber material along a predetermined path onto the mold to form the desired shape. The angle and number of layers of the fiber can also be controlled during winding to achieve different strength and stiffness requirements. After winding, the resin such as epoxy resin is infiltrated into the fiber, and the composite component with excellent mechanical properties is finally formed after heat curing and other process treatments. In the simulation, the roving width cannot be effectively displayed, and it is impossible to determine whether the winding pattern is evenly covered, the actual production test is often required, resulting in low pattern design and production efficiency.

SUMMARY

The purpose of the invention is to provide a circular pipe filament winding process simulation method, system, medium, and product, which can determine the winding pattern of small angle circular pipes and improve production efficiency.

In order to achieve the above purpose, the invention provides the following scheme:

A circular pipe filament winding process simulation method, including:
  according to a geometric parameter of a circular pipe and a current pseudo dome parameter, constructing a stepped shaft circular pipe model;
  according to a winding parameter, calculating an initial center rotation angle of a current stepped shaft circular pipe model for filament winding;
  according to the initial center rotation angle and a given deviation rotation angle, calculating a theoretical center rotation angle satisfying a preset uniform winding condition;
  according to the theoretical center rotation angle, determining a theoretical slip coefficient within a given slip coefficient range;
  determining whether a slip coefficient of an end point of the current stepped shaft circular pipe model is less than a current theoretical slip coefficient;
  if so, performing a simulation of a circular pipe filament winding process according to the current stepped shaft circular pipe model and a pattern trajectory, the pattern trajectory is obtained according to the current theoretical slip coefficient;
  if not, modifying the current pseudo dome parameter, and returning steps of constructing the stepped shaft circular pipe model according to the geometric parameter of the circular pipe and the current pseudo dome parameter.

Optionally, according to a geometric parameter of a circular pipe and a current pseudo dome parameter, constructing a stepped shaft circular pipe model, including:
  according to the geometric parameter of the circular pipe and the current pseudo dome parameter, using an OpenGL drawing function to construct the stepped shaft circular pipe model.

Optionally, the winding parameter includes a roving width, a slip coefficient, and a dwell angle.

Optionally, according to the initial center rotation angle and the given deviation rotation angle, calculating the theoretical center rotation angle satisfying the preset uniform winding condition, including:
  according to the initial center rotation angle and the given deviation rotation angle, calculating the theoretical center rotation angle satisfying the preset uniform winding condition by using a continued fraction theory.

Optionally, according to the theoretical center rotation angle, determining the theoretical slip coefficient within a given slip coefficient range, including:
  according to the theoretical center rotation angle, determining the theoretical slip coefficient within the given slip coefficient range by using a dichotomy method.

Optionally, performing the simulation of the circular pipe filament winding process according to the current stepped shaft circular pipe model and the pattern trajectory, including:
  calculating a unit normal vector and a unit tangent vector of each point on the pattern trajectory;
  according to the unit normal vector and unit tangent vector of each point, calculating a unit offset vector of each point;
  according to a roving width and the unit offset vector of each point on the pattern trajectory, performing the pipe filament winding process simulation.

A computer system, including a memory, a processor, and a computer program stored on the memory and capable of running on the processor, the processor executes the computer program to implement the steps of the pipe filament winding process simulation method.

A computer readable storage medium, the computer program is stored on the computer readable storage medium, when the computer program is executed by the processor, the steps of the circular pipe filament winding process simulation method are implemented.

A computer program product, including a computer program, when the computer program product is executed by the processor, and the steps of the circular pipe filament winding process simulation method are implemented.

According to the specific implementation examples provided by the invention, the invention discloses the following technical effects:

By judging whether the slip coefficient of the end point of the stepped shaft circular pipe model is less than the current theoretical slip coefficient, the invention obtains a pattern that satisfies the uniform distribution, and can determine the winding pattern of the small angle circular pipe, thereby improving the production efficiency.

BRIEF DESCRIPTION OF THE DRAWINGS

In order to more clearly explain the embodiment of the invention or the technical scheme in the existing technology, the following will briefly introduce the drawings that need to be used in the embodiment. Obviously, the drawings in the following description are only some embodiments of the invention. Ordinary technicians in this field can also obtain other drawings based on these drawings without paying creative labor.

DETAILED DESCRIPTION OF THE EMBODIMENTS

The following will be combined with the drawings of the embodiment of the invention to clearly and completely describe the technical scheme of the embodiment of the invention. Obviously, the described embodiment is only part of the embodiment of the invention, not all of the embodiments. Based on the embodiments in the invention, all other embodiments obtained by ordinary technicians in this field without making creative labor belong to the scope of protection of the invention.

The purpose of the invention is to provide a circular pipe filament winding process simulation method, system, medium, and product, which can determine the winding pattern of small angle circular pipes and improve production efficiency.

In order to make the above purposes, characteristics, and advantages of the invention more obvious and easy to understand, the following is a further detailed description of the invention in combination with the drawings and specific implementation methods.

The invention solves the problem that the fiber waste production cost is relatively high when the small angle circular pipe adopts the cylinder transition, or the pay-out eye is easy to hit the pin, and the end pattern changes due to the pin when the pin is wound. A circular pipe filament winding process simulation method includes: the mandrel of the stepped shaft circular pipe is established according to the parameters of circular pipe and the set parameters of pseudo dome; the initial center rotation angle is calculated according to the dwell angle, roving width and slip coefficient; according to the initial center rotation angle and the deviation rotation angle, the theoretical center rotation angle satisfying the uniform distribution is obtained according to the continued fraction theory; the slip coefficient is optimized to obtain a pattern trajectory; the slip coefficient of the end of the pseudo dome at each point is calculated according to the uniform full pattern, and whether the slip coefficient is less than the maximum slip coefficient allowed between the mandrel surface and the fiber is determined. If so, continue the next step, otherwise, return to the first step, the pseudo dome parameter is set, and the above steps are repeated; the simulation is performed according to the mandrel and the pattern trajectory. The invention can improve the efficiency of the design and production of small angle circular pipe filament winding lines.

Embodiment 1

Figure 1:
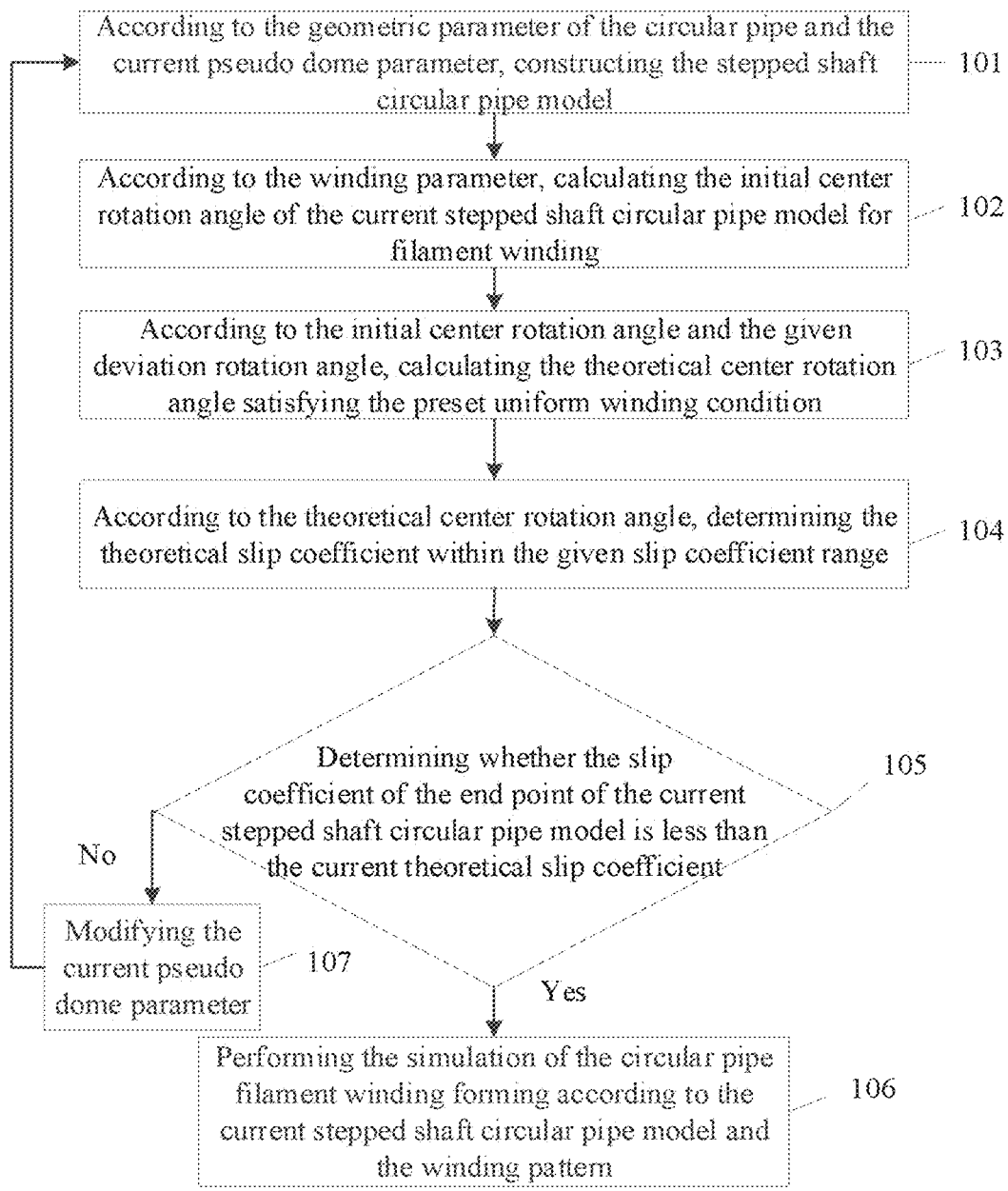
FIG. 1 is a flow diagram of a circular pipe filament winding process simulation method provided by Embodiment 1 of the invention.

As shown in FIG. 1, the simulation method for pipe filament winding process in this embodiment includes the following steps.

Step 101: according to the geometric parameter of the circular pipe and the current pseudo dome parameter, a stepped shaft circular pipe model is constructed;

Step 102: according to the winding parameter, the initial center rotation angle of the current stepped shaft circular pipe model for filament winding is calculated;

Step 103: according to the initial center rotation angle and the given deviation rotation angle, the theoretical center rotation angle satisfying the preset uniform winding condition is calculated;

Step 104: according to the theoretical center rotation angle, the theoretical slip coefficient within the given slip coefficient range is determined;

Step 105: whether the slip coefficient of the end point of the current stepped shaft circular pipe model is less than the current theoretical slip coefficient is determined;

If the output of Step 105 is yes, Step 106 is executed.

Step 106: according to the current stepped shaft pipe model and pattern trajectory, the circular pipe filament winding process simulation is performed, and the pattern trajectory is obtained according to the current theoretical slip coefficient.

If the output of Step 105 is no, then Step 107 is executed.

Step 107: the current pseudo dome parameter is modified and returns to Step 101.

Where Step 101 includes: according to the geometric parameters of the circular pipe, the current pseudo dome parameters, and the mandrel parameters, the OpenGL drawing function is used to construct the stepped shaft circular pipe model.

The mandrel parameters include the cylinder length and the cylinder radius of the stepped shaft circular pipe model.

The current pseudo dome parameter is the given pseudo dome parameter when the first stepped shaft pipe model is constructed, the pseudo dome specifically refers to the elliptical shape.

Figure 2:
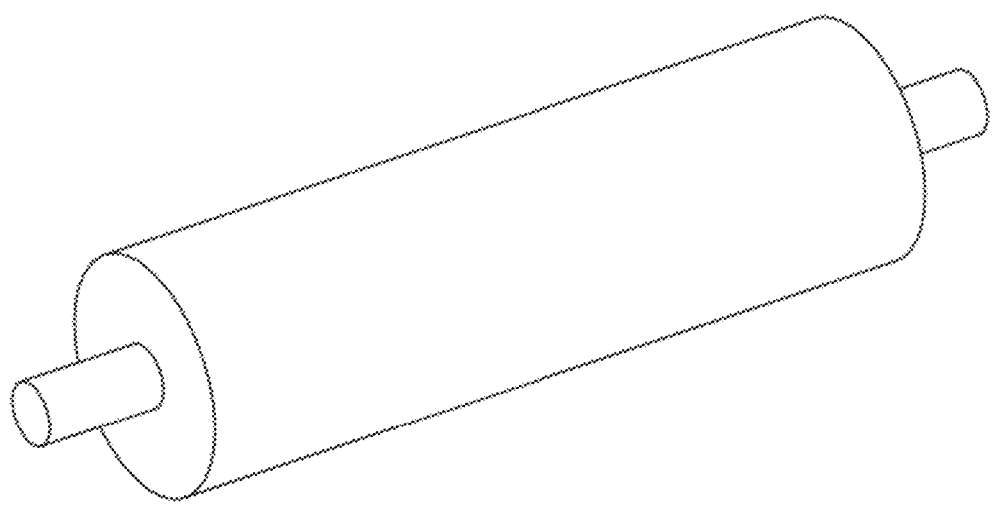
FIG. 2 is a schematic diagram of the stepped shaft circular pipe model provided by Embodiment 1 of the invention.

The length of the stepped shaft of the stepped shaft circular pipe model is slightly smaller than the short half shaft of the given elliptical dome, the stepped shaft is mainly for the fiber to slide on the mandrel. The stepped shaft circular pipe model is shown in FIG. 2.

In Step 102, the winding parameters include the roving width, the slip coefficient (the initial given slip coefficient), and the dwell angle.

Step 102 includes: the initial center rotation angle is calculated according to the mandrel parameters, yarn parameters, slip coefficient, and dwell angle.

The solution equation of the initial center rotation angle is:

$$\begin{cases} \dfrac{d_\alpha}{d_z} = \dfrac{\lambda xy\tan^2\alpha}{(x^2\sin^2\theta + y^2\cos^2\theta)^{\frac{3}{2}}\cos\alpha(1+\tan^2\alpha)} \\ \dfrac{d_\alpha}{d_z} = \dfrac{\tan\alpha}{(x^2\sin^2\theta + y^2\cos^2\theta)^{\frac{1}{2}}} \end{cases}$$

where $\alpha$ is the winding angle; $\theta$ is the actual center rotation angle; z is the axial coordinate; $\lambda$ is the slip coefficient; x is the long semi-axis of the elliptical section corresponding to the axial coordinate; y is the elliptical cross-section short semi-axis corresponding to the axial coordinate. Through the center rotation angle of the fourth-order pseudo dome of the Runge-Kutta method, the initial center rotation angle $\theta_0$ of the trajectory is obtained.

Where Step 103 specifically includes: according to the initial center rotation angle and the given deviation rotation angle, the theoretical center rotation angle satisfying the preset uniform winding condition is calculated by using the continued fraction theory.

Step 1031: According to the initial center rotation angle $\theta_0$ and the given deviation rotation angle $\Delta\theta$, the maximum value $P_{max}$ and the minimum value $P_{min}$ of mandrel turns for a round trip of the carriage are calculated. The calculation formula is as follows:

$$\begin{cases} P_{max} = (\theta_0 + \Delta\theta)/360 \\ P_{min} = (\theta_0 - \Delta\theta)/360 \end{cases}$$

Step 1032: the value range of span d is determined by $[P_{min}, P_{max}]$ and $[N_{min}, N_{max}]$ to be $[d_{min}, d_{max}]$, the calculation formula is:

$$P = r + \dfrac{d}{N}$$

where P is the number of turns of the mandrel for a round trip of the carriage, and d is the spacing between two adjacent laying rovings. r is the integer number of turns of a circular mandrel for a round trip of the carriage. N is the number of large circumferences divided equally with the roving width as the scale.

Step 1033: The roving width is input to obtain the expressed number of large circumferences N divided equally with the roving width as the scale at the end of the dome, the calculation formula is as follows:

$$N = \dfrac{\pi D \cos\alpha}{B}$$

where B is the roving width.

Step 1034: The integer is taken in the range of N±2, and then the range of d value is obtained and the integer is taken, the calculation formula is as follows:

$$d = N(P-r)$$

Step 1035: the screening is performed under the condition that d and N are coprime (preset uniform winding condition), the combination that does not conform is deleted, and the number of tangent points corresponding to the winding pattern is obtained by applying the continuous fraction rolling and dividing method to $$\dfrac{d}{N}.$$

Step 1036: The theoretical center rotation angle $\theta$ is calculated, the calculation formula is as follows:

$$\theta = 360\left(2 - \dfrac{d}{N}\right)$$

where Step 104 specifically includes: According to the theoretical center rotation angle, the dichotomy is used to determine the theoretical slip coefficient within the given slip coefficient range. The pattern trajectory is obtained according to the theoretical slip coefficient.

where in Step 105, because the pattern is designed according to the dome, and there is no dome in the actual winding, it is impossible to judge whether the fiber will slip at the end of the mandrel during the actual winding process, by calculating whether the slip coefficient of the end position at each point of the pseudo dome is less than the maximum slip coefficient between the mandrel and the fiber to determine whether the pattern can be stably wound. That is, whether the end slip coefficient is less than the allowable slip coefficient (theoretical slip coefficient), if it is less than the allowable slip coefficient (theoretical slip coefficient), the uniform full line shape satisfying the stable winding condition is obtained, on the contrary, the design parameters of the mandrel are returned to modify the parameters of the pseudo dome, the above steps are repeated.

More specifically, Step 105 includes calculating the unit normal vector n of all trajectory points.

The calculation formula of the unit normal vector n is as follows:

$$\vec{r} = (r\cos\theta, r\sin\theta, z)$$

$$\vec{n} = \dfrac{\vec{r}_\theta \times \vec{r}_z}{|\vec{r}_\theta \times \vec{r}_z|} = \dfrac{1}{(1+r'^2)^{\frac{1}{2}}}(\cos\theta, \sin\theta, -r')$$

where $\vec{r}$ is the mandrel surface equation; $\theta$ is the theoretical center angle; $\vec{r}_\theta$ is the first derivative of $\theta$, $\vec{r}_z$ is the first derivative of z; r' is the first derivative of the radius of a parallel circle (the section of the circular pipe).

The unit tangent vector $\vec{T}$ of all trajectory points is calculated.

The calculation formula of the unit tangent vector $\vec{T}$ is as follows:

$$\vec{T} = (r'\cos\theta - a\sin\theta\theta', r'\sin\theta + b\cos\theta\theta', 1)$$

$$\theta = \dfrac{(1+r'^2)^{\frac{1}{2}} * \tan(\alpha)}{(a^2\sin^2\theta + b^2\cos^2\theta)^{\frac{1}{2}}}$$

where θ' denotes the first derivative of the theoretical center rotation angle.

The first point of the endpoint P0 (x0, y0, z0) and the location point of the endpoint P1 (x1, y1, z1), and the normal vector α (αx, αy, αz) and tangent vector and T (tx, xy, tz) of the endpoint are extracted.

It is assumed that a point on the pseudo dome is P2 (x2, y2, z2), then the tangent vector before P1 is T1 (x1-x0, y1-y0, z1-z0), and the tangent vector β after P1 is T2 (x3-x2, y3-y2, z3-z2), the calculation formula of the secondary normal vector of P1 is:

$$\beta = T1 \times T2$$

The slip coefficient λ of the endpoint is calculated when P2 is calculated, and the calculation formula is:

$$\lambda = \tan\left(\arccos\left(\frac{n \cdot (\beta \times \alpha)}{|n \cdot (\beta \times \alpha)|}\right)\right)$$

where n is the normal vector.

Each point of the pseudo dome is brought into P2 for a solution, if the slip coefficient of each point satisfies the condition, the next step is performed; otherwise, return to the design parameters of the mandrel, modify the pseudo dome parameters are modified and the above steps are repeated.

Where Step 106 specifically includes:

The unit normal vector and unit tangent vector of each point on the pattern trajectory are calculated.

According to the unit normal vector and unit tangent vector of each point, the unit offset vector of each point is calculated. The unit offset vector is the cross product of the unit normal vector and the unit tangent vector of the trajectory point.

According to the roving width and the unit offset vector of each point on the pattern trajectory, the circular pipe filament winding process simulation is performed, including: according to the roving width and the unit offset vector, the positive and negative offset trajectory points can be obtained, and then the quadrilateral patch can be drawn to complete the simulation of the fiber roving width.

Figure 3:
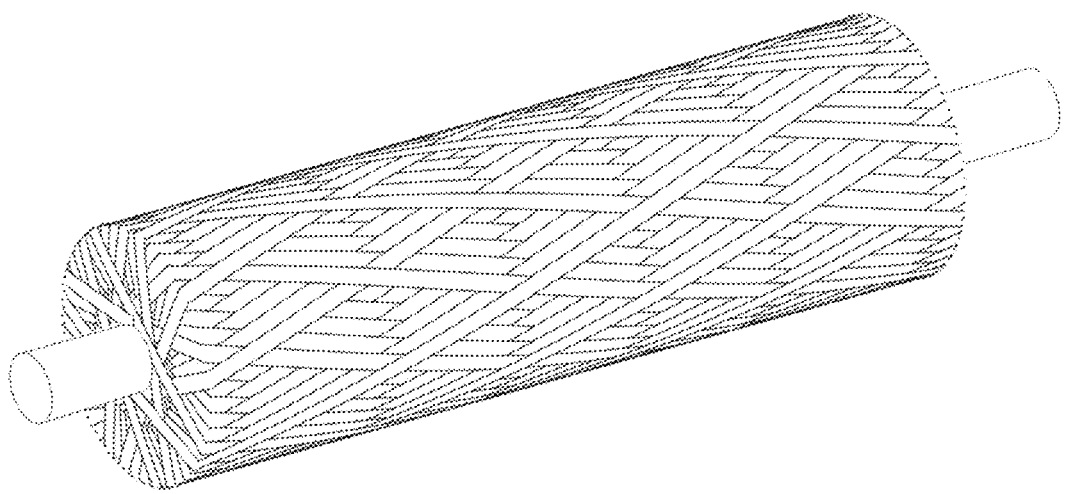
FIG. 3 is a simulation diagram of the circular pipe with roving width provided by Embodiment 1 of the invention.
Figure 4:
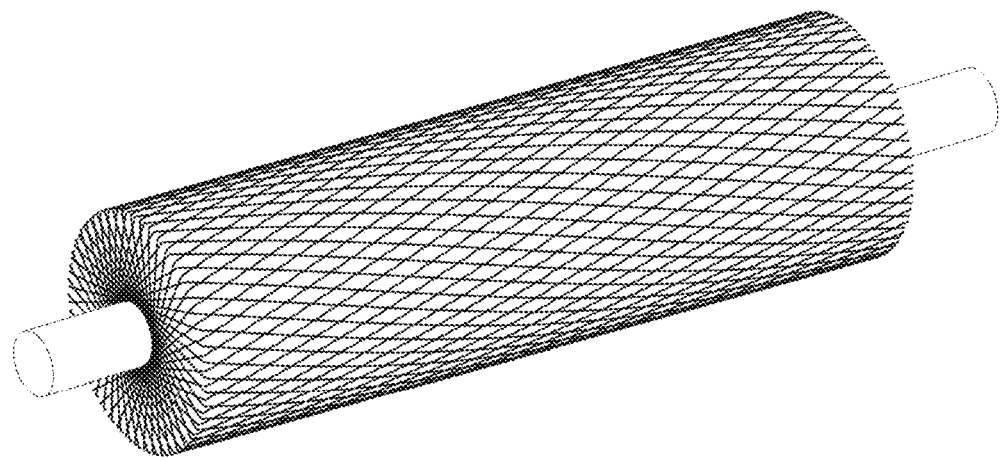
FIG. 4 is a simulation diagram without the roving width provided by Embodiment 1 of the invention.

As a specific example, the mandrel is a circular pipe mandrel. In this example, the length of the cylindrical section L=1000 mm, the radius of the cylindrical section r=150 mm, the half shaft of the pseudo dome a=20 mm, the radius of the polar hole r0=40 mm, the slip coefficient μ=0.0, the roving width B=10 mm, the dwell angle $\beta_0$=360, the calculated winding angle of the cylindrical section is 19.54°, and the center angle is 1276°. The mandrel configuration is depicted in FIG. 2, while FIG. 3 presents the simulation results of the pattern incorporating roving width. In contrast, FIG. 4 illustrates the simulation results of the pattern excluding roving width.

Based on the pipe filament winding process simulation method in this invention, a computer aided design (CAD)/computer aided manufacturing (CAM) system for small angle circular pipe winding can be developed.

Embodiment 2

A circular pipe filament winding process simulation system includes:

Mandrel module: The parameters of the mandrel are obtained, and the OpenGL drawing function is used to establish the mandrel model of the stepped shaft circular pipe according to the mandrel parameters.

Pattern design module: According to the mandrel data and design parameters, the initial center rotation angle is calculated, the initial center rotation angle and the deviation rotation angle are used to calculate the theoretical center rotation angle that satisfies the uniform distribution of the lines, and the slip coefficient is optimized to obtain the pattern trajectory point.

Simulation module: The simulation is performed according to the pattern trajectory point and mandrel.

Post-processing module: G code is generated for CNC machine tool production.

The simulation module includes two distinct modes: one excluding roving width and the other incorporating roving width.

Without roving width simulation, the simulation is performed according to the pattern trajectory and mandrel.

In the roving width simulation, the unit tangent vector and the unit normal vector of the trajectory point are calculated according to the pattern trajectory, the offset trajectory point is calculated according to the roving width, and the simulation is performed according to the pattern offset trajectory point and the mandrel.

In this implementation, a circular pipe filament winding process simulation system is a circular pipe filament winding process simulation system based on C++ programming.

Embodiment 3

A computer system, including a memory, a processor, and a computer program stored on the memory and run on the processor, and the processor executes the computer program to implement the steps of the circular pipe filament winding process simulation method described in Embodiment 1.

Embodiment 4

A computer readable storage medium, the computer program is stored on the computer readable storage medium, when the computer program is executed by the processor, the steps of the circular pipe filament winding process simulation method described in Embodiment 1 are realized.

Embodiment 5

A computer program product, including a computer program, when the computer program is executed by the processor, the steps of the circular pipe filament winding process simulation method described in Embodiment 1 are realized.

It should be noted that the object information (including but not limited to object system information, object personal information, etc.) and data (including but not limited to data for analysis, stored data, displayed data, etc.) involved in the invention are all information and data authorized by the object or fully authorized by the parties.

The general technical personnel in this field can understand all or part of the process of implementing the above embodiments, which can be completed by a computer program to instruct the relevant hardware, the computer program can be stored in a non-volatile computer readable storage medium, when the computer program is executed, it can include the processes of the embodiments of the above methods. Among them, any reference to memory, database, or other media used in each embodiment provided by the invention may include at least one non-volatile memory and volatile memory. Non-volatile memory can include read-only memory (ROM), tape, floppy disk, flash memory, optical memory, high-density embedded non-volatile memory, resistive random access memory (ReRAM), magnetoresistive random access memory (MRAM), ferroelectric random access memory (FRAM), phase change memory (PCM), graphene memory, etc. The volatile memory can include random access memory (RAM) or external high-speed buffer memory. As an illustration rather than a limitation, RAM can be in many forms, such as static random access memory (SRAM) or dynamic random access memory (DRAM). The database involved in each embodiment provided by the invention may include at least one of the relational database and the non-relational database. The non-relational database can include blockchain-based distributed databases, etc., and are not limited to this. The processors involved in each embodiment provided by the invention can be general-purpose processors, central processors, graphics processors, digital signal processors, programmable logic devices, data processing logic devices based on quantum computing, etc., which are not limited to this.

The technical features of the above implementations can be arbitrarily combined, in order to make the description simple, all possible combinations of the technical features in the above implementations are not described. However, as long as there is no contradiction in the combination of these technical features, it should be considered as the scope recorded in this specification.

In this invention, specific embodiments are used to explain the principle and implementation of the invention, the above embodiments are only used to help understand the method and core idea of the invention. At the same time, for the general technical personnel in this field, there will be changes in the specific implementation methods and application scope according to the idea of the invention. In summary, the content of this instruction should not be understood as a limitation to the invention.

What is claimed is:

1. A circular pipe filament winding process simulation method, comprising:

according to a geometric parameter of a circular pipe to be wound and a current pseudo dome parameter of a pseudo dome used for the circular pipe, constructing, by a computer and using an OpenGL drawing function, a current stepped shaft circular pipe model;

according to a winding parameter, calculating, by the computer, an initial center rotation angle of the current stepped shaft circular pipe model for filament winding; wherein the winding parameter comprises a roving width, a slip coefficient, and a dwell angle of a roving for filament winding the circular pipe;

according to the initial center rotation angle and a given deviation rotation angle, calculating, by the computer, a theoretical center rotation angle satisfying a preset uniform winding condition;

according to the theoretical center rotation angle, determining, by the computer, a theoretical slip coefficient within a given slip coefficient range;

determining, by the computer, whether a slip coefficient of an end point of the current stepped shaft circular pipe model is less than a current theoretical slip coefficient;

if the slip coefficient of the end point of the current stepped shaft circular pipe model is less than the current theoretical slip coefficient, performing, by the computer, a simulation of a circular pipe filament winding process according to the current stepped shaft circular pipe model and a pattern trajectory to obtain an optimized winding scheme, and winding the circular pipe according to the optimized winding scheme by using a computer-controlled automated filament winding machine, the pattern trajectory is obtained according to the current theoretical slip coefficient;

if the slip coefficient of the end point of the current stepped shaft circular pipe model is not less than the current theoretical slip coefficient, modifying, by the computer, the current pseudo dome parameter, and returning steps of constructing the stepped shaft circular pipe model according to the geometric parameter of the circular pipe and the current pseudo dome parameter until the slip coefficient of the end point of the current stepped shaft circular pipe model is less than a current theoretical slip coefficient;

performing, by the computer, the simulation of the circular pipe filament winding process according to the current stepped shaft circular pipe model and the pattern trajectory, comprising:

calculating a unit normal vector and a unit tangent vector of each point on the pattern trajectory;

according to the unit normal vector and unit tangent vector of each point, calculating a unit offset vector of each point;

according to the roving width and the unit offset vector of each point on the pattern trajectory, performing the simulation of the circular pipe filament winding process.

2. The circular pipe filament winding process simulation method according to claim 1, wherein according to the initial center rotation angle and the given deviation rotation angle, calculating, by the computer, the theoretical center rotation angle satisfying the preset uniform winding condition, comprising:

according to the initial center rotation angle and the given deviation rotation angle, calculating the theoretical center rotation angle satisfying the preset uniform winding condition by using a continued fraction theory.

3. The circular pipe filament winding process simulation method according to claim 1, wherein according to the theoretical center rotation angle, determining, by the computer, the theoretical slip coefficient within a given slip coefficient range, comprising:

according to the theoretical center rotation angle, determining the theoretical slip coefficient within the given slip coefficient range by using a dichotomy method.

4. A computer system, comprising a memory, a processor, and a computer program stored on the memory and capable of running on the processor, wherein the processor executes the computer program to implement the steps of the circular pipe filament winding process simulation method according to claim 1.

5. A non-transitory computer readable storage medium, a computer program is stored on the non-transitory computer readable storage medium, when the computer program is executed by a processor, the steps of the circular pipe filament winding process simulation method according to claim 1.

* * * * *